Patented Jan. 10, 1950

2,494,034

UNITED STATES PATENT OFFICE 2,494,034

PRODUCTION OF UNSATURATED HALIDES

George J. Carlson, El Cerrito, Calif., assignor to Shell Development Company, San Francisco, Calif., a corporation of Delaware No Drawing. Application August 5, 1946, Serial No. 688,417

5 Claims. (Cl. 260—654)

1

This invention relates to a process of preparing allyl-type halides. More particularly, the invention concerns a process of preparing, in the absence of substantial polymerization of allyl compounds, allyl bromide or chloride, and methyl-substituted allyl bromide or chloride, which process involves reacting an allyl-type ether with hydrogen halide in the presence of a cuprous salt as catalyst.

In accordance with the present invention there is provided a process whereby certain allyl-type ethers may be converted with the aid of a particular catalyst to the corresponding allyl-type chloride or bromide in high yield and without significant polymerization of allyl-type compounds. It has been found that solid cuprous salts, preferably cuprous chloride, are efficient and highly desirable catalysts for the conversion of the allyl-type ethers to the allyl-type chlorides or bromides. The cuprous salts such as cuprous chloride or cuprous bromide are of particular advantage in accordance with the process of the present invention because through their use it is possible to carry out the process with high yields of the allyl-type chloride or bromide and without significant polymerization of allyl-type compounds.

In the practice of the present invention, the allyl-type ether in the liquid state is reacted with a hydrogen halide selected from the class consisting of hydrogen bromide and hydrogen chloride, at a pressure preferably above atmospheric, and at a temperature below the boiling point of the ether at the pressure employed in the presence of catalytically active amounts of a solid cuprous salt, preferably solid cuprous halide containing the same halogen as the hydrogen halide used. As the cuprous salt there may be employed, for example, cuprous halides such as cuprous iodide, cuprous bromide, cuprous fluoride, or cuprous chloride. If desired, other solid cuprous salts may be employed. It has been found, however, that the use of the cuprous halide containing the same halogen as the hydrogen halide used, provides particularly advantageous results in respect to yield, purity of product, etc., and its use, therefore, is preferred. Thus, when allyl-type chlorides are prepared by reaction of allyl-type ether with hydrogen chloride, it is preferred to use cuprous chloride as the catalyst. Similarly, when allyl-type bromides are to be prepared by reaction of allyl-type ethers with hydrogen bromide, it is preferred to use cuprous bromide as the catalyst.

The allyl-type ethers with which the advantages

2 of the present invention are particularly realized are the symmetrical unsaturated ethers containing olefinic bonds in the beta,gamma positions and containing an even number of carbon atoms, not less than 6 nor greater than 8. Specifically, the present invention thus contemplates the conversion of diallyl ether, and the symmetrical di(monomethyl allyl) ethers: di(methallyl) ether, dicrotyl ether and di(methylvinyl-carbinyl) ether to the corresponding unsaturated chlorides or bromides; i. e., to allyl chloride or bromide, methallyl chloride or bromide, crotyl chloride or bromide, and methylvinylcarbinyl chloride or bromide, respectively. The process of the present invention is of particular advantage as applied to the reaction of hydrogen chloride or hydrogen bromide with diallyl ether, di(methallyl) ether, and dicrotyl ether.

In accordance with the process of the invention, the liquid, preferably anhydrous, unsaturated ether is contacted with a gaseous, substantially anhydrous hydrogen halide selected from the group consisting of hydrogen bromide and hydrogen chloride, in the presence of a cuprous salt present in an amount sufficient to catalyze the reaction. Catalytic amounts of solid cuprous salt generally lie between about 0.1% and about 5.0% by weight of the unsaturated ether used. Particularly satisfactory results are obtained when there are employed amounts of solid cuprous salt containing the same halogen as the hydrogen halides employed, in an amount between about 0.5% and about 2.0% by weight of the diallyl ether. The catalyst preferably is used in the solid state. It may be in the form of lumps or fragments of suitable size. Alternatively, the catalyst may be used in the form of crystals or of a powder which is suspended in the reaction mixture and recovered subsequent to completion of the reaction. If desired, the cuprous salt may be supported in the reaction zone upon a suitable inert support, such as, for example, pumice, kieselguhr, etc.

The unsaturated ether, the hydrogen halide, and the cuprous salt catalyst may be brought into reactive contact either batchwise or, for example, by passing continuously the unsaturated, allyl-type ether and hydrogen halide in the desired proportion over solid cuprous salt at such a rate that the desired contact time ensues. In the case of batchwise operation, the symmetrical unsaturated ether containing olefinic bonds in the beta, gamma positions and containing an even number of carbon atoms not less than 6 nor greater than 8, and the desired amount of cuprous salt may, for example, be introduced into a suitable reaction vessel and gaseous hydrogen chloride or hydrogen bromide added in the desired amount. In the case of continuous operation, a fluid stream comprising a mixture of liquid ether and gaseous hydrogen halide may be passed, for example, through an elongated reaction chamber of suitable length containing a solid cuprous salt. Alternatively, liquid ether may be passed over a bed of solid cuprous salt positioned in a suitable chamber and maintained under an atmosphere of the desired hydrogen halide gas. Alternative modes of carrying out the process of the present invention are possible and will be apparent to those skilled in the art. In the case of either continuous or batchwise operations the olefinic halide reaction product readily may be recovered from the reacted mixture as by neutralizing any excess hydrogen halide present and separating the organic components of the reacted mixture as by fractional distillation, or by other suitable means of recovery.

The temperatures and pressure employed in the process of the present invention are maintained at such values during the reaction that the allyl-type ether employed remains in the liquid state. The reaction thus carried out at a temperature below the boiling point of the ether at the pressure employed. Preferably the temperature is maintained within the range of about 0° C. to about 90° C., and for most favorable conditions of operation within the range of from about 15° C. to about 40° C. If desired, the temperature may in certain instances be maintained between the boiling points of the unsaturated ether reactant and the olefinic halide product at the pressure employed, thus enabling partial or complete removal of the reaction product as it is formed. Generally, however, it is desired to conduct the reaction in a closed reaction vessel, and hence temperatures below the boiling point of the allyl-type ether and corresponding halide at the pressure employed are preferred. The time required for completion of the reaction depends upon the temperature employed, the amount of catalyst present and similar factors. Generally speaking, at about 30° C. and in the presence of about 0.5–2.0% of catalyst, a reaction time of from about ½ to about 3 hours is satisfactory.

The actual pressure used in the process is determined in part by the relative amounts of the unsaturated ether and hydrogen chloride or hydrogen bromide that are to be contacted. It is preferable to employ a molar excess of the hydrogen halide over the unsaturated ether. The use of lesser amounts of hydrogen halide tends to affect adversely the relative conversion of allyl-type ether charged to olefinic halide recovered. Preferably the reactants are employed in a molar ratio not less than about 2 moles of the hydrogen halide per mole of the unsaturated ether. For maximum benefits it is desirable to maintain the hydrogen halide:unsaturated ether molar ratio at a value not less than about 4:1.

The reaction preferably is carried out at a pressure above atmospheric obtained by introduction of gaseous hydrogen halide into the reaction chamber, although in certain instances satisfactory results have been obtained at atmospheric pressures. Highly favorable results thus have been obtained using pressures of not less than 30 pounds per square inch (gauge), preferably between about 30 pounds per square inch (gauge) and about 200 pounds per square inch (gauge). The actual pressure employed depends in part upon the pressure that is required to introduce the desired amount of hydrogen halide into the particular reaction vessel or chamber that is used. By providing a sufficient gaseous volume over the liquid phase of the reaction mixture or a suitable reservoir of hydrogen halide gas, it thus is possible to carry out the process of the present invention at substantially atmospheric pressures. However, the use of elevated pressures as aforementioned generally is preferred because of resulting favorable effects upon the rate of reaction, extent of reaction, etc. In those instances where the size of the reaction vessel or reaction zone dictates, the pressure may be permitted to rise through the introduction of the gaseous hydrogen chloride to a value sufficiently high to maintain the desired amount of hydrogen halide within the reaction zone.

It will be appreciated that by the term "hydrogen chloride" or "hydrogen bromide" in the present specification and appended claims, reference is made to anhydrous or substantially anhydrous gaseous hydrogen chloride or hydrogen bromide, respectively, as contrasted to the aqueous acids containing in the order of 45 to 50 weight per cent hydrogen halide. The present process thus is carried out using substantially anhydrous reactants and catalyst i. e., in the substantial absence of added water. Water is formed as one of the products of reaction between the unsaturated ether and the hydrogen halide. Excessive accumulation of such water tends to reduce the yield of olefinic chloride and to promote undesired side reactions. Its removal in continuous operations or in the case of repeated batch-wise operations therefore is desirable, as by replacing the catalyst with fresh anhydrous catalyst or by equivalent means apparent to those skilled in the art. It has been found, however, that the amount of water formed as in one batch operation does not affect adversely the outcome of the process.

The reacted mixture obtained as a result of the present process contains the olefinic halide and any unreacted unsaturated ether as well as residual amounts of hydrogen halide dissolved in the organic materials or in any water that may be present. Small amounts of cuprous salt either as a solid or dissolved in any water present, also may occur. The olefinic halide readily may be separated as by neutralizing any free HCl or HBr, say with aqueous alkali solution, and fractionally distilling the organic phase of the mixture. Alternative means of separating the olefinic halide may be used, however, and will be apparent to those skilled in the art.

The process of the present invention is characterized by being adapted to provide under optimum conditions substantially quantitative yields of the olefinic halides based upon the amount of the allyl-ether consumed. The process thus is highly efficient and is capable of operation with an economy of reactants that renders the process of outstanding value for the commercial production of the olefinic halides herein disclosed.

The following examples will serve to illustrate certain specific embodiments of the present invention.

*Example I*

9.75 moles of hydrogen chloride and 4.90 moles of diallyl ether were placed in a glass reaction vessel in the presence of about 2 per cent of cuprous chloride based on the weight of diallyl ether. The contents of the vessel were maintained at about 30° C. and under approximately atmospheric pressure. After about 2 ½ hours the contents of the reaction vessel were neutralized with aqueous sodium hydroxide and the organic liquid phase was fractionally distilled. 85.4% of the diallyl ether charged was found to have been converted to allyl chloride and 14.6% of the diallyl ether was recovered unreacted.

*Example II*

12.5 moles of hydrogen chloride and 4.1 moles of diallyl ether were charged into a steel reaction vessel containing about 1% cuprous chloride based on the weight of diallyl ether. The contents of the reaction vessel were maintained for one hour at a temperature of about 30° C. and under a maximum pressure of 150 pounds per square inch (gauge). After separation as in the preceding example, 90 per cent of the diallyl ether was found to have been converted to allyl chloride. Ninety-seven per cent of the hydrogen chloride used was recovered as free acid or in the form of allyl chloride.

*Example III*

Ten moles of hydrogen chloride and two moles of di(methallyl) ether were charged into a reaction vessel containing about 1.5% of cuprous chloride based upon the weight of di(methallyl) ether. The contents of the reaction vessel were maintained at a temperature of about 30° C. to about 50° C. and under a maximum pressure of about 175 pounds per square inch (gauge) for about two hours. Methallyl chloride was recovered by the method employed in the preceding examples, in good yield based upon the di(methallyl) ether consumed.

*Example IV*

One half mole of dicrotyl ether was contacted at substantially atmospheric pressure with about 1.5% by weight of cuprous bromide under an atmosphere of gaseous hydrogen bromide in a reaction vessel connected with a reservoir of hydrogen bromide sufficient to provide at least 4 moles of hydrogen bromide gas per mole of dicrotyl ether. After a reaction period of about 5 hours at about 40° C., the liquid reaction mixture was removed from the reaction vessel, washed with aqueous alkali, and fractionally distilled. Crotyl bromide was recovered in good yield based upon the dicrotyl ether consumed.

*Example V*

Example I was repeated, using hydrogen bromide instead of hydrogen chloride. Allyl bromide was recovered from the reaction mixture in good yield based upon the diallyl ether consumed.

I claim as my invention:

1. A process which comprises (a) mixing a symmetrical bis(2-alkenyl) ether containing an even number of carbon atoms not less than 6 nor greater than 8 with an excess of a hydrogen halide selected from the class consisting of hydrogen chloride and hydrogen bromide, (b) reacting said ether in liquid phase with said hydrogen halide present in an amount corresponding to a molar ratio of hydrogen halide: bis (2-alkenyl) ether not less than about 4:1 at a temperature within the range of from 15° C. to 40° C. under substantially anhydrous conditions at a superatmospheric pressure between about 30 lbs. per square inch and about 200 lbs. per square inch in the presence of a cuprous halide corresponding to said hydrogen halide as catalyst, and (c) recovering a 2-alkenyl halide from the resulting mixture.

2. A process which consists in reacting diallyl ether in liquid phase with hydrogen chloride present in an amount corresponding to a molar ratio of hydrogen chloride:diallyl ether not less than about 4:1, at a temperature within the range of from 15° C. to 40° C. at a superatmospheric pressure between about 30 lbs. per square inch and about 200 lbs. per square inch and in the presence of cuprous chloride, and recovering allyl chloride from the resulting mixture.

3. A process which consists in reacting di(methallyl) ether in liquid phase with hydrogen chloride present in an amount corresponding to a molar ratio of hydrogen chloride:di(methallyl) ether not less than about 4:1, at a temperature within the range of from 15° C. to 40° C. at a superatmospheric pressure between about 30 lbs. per square inch and about 200 lbs. per square inch and in the presence of cuprous chloride, and recovering methallyl chloride from the resulting mixture.

4. A process which consists in reacting dicrotyl ether in liquid phase with hydrogen chloride present in an amount corresponding to a molar ratio of hydrogen chloride:dicrotyl ether not less than about 4:1, at a temperature within the range of from 15° C. to 40° C. at a superatmospheric pressure between about 30 lbs. per square inch and about 200 lbs. per square inch and in the presence of cuprous bromide, and recovering crotyl chloride from the resulting mixture.

5. A process which comprises (a) mixing a symmetrical bis(2-alkenyl) ether containing an even number of carbon atoms not less than 6 nor greater than 8 with an excess of a hydrogen halide selected from the class consisting of hydrogen chloride and hydrogen bromide, (b) reacting said ether in liquid phase with said hydrogen halide present in an amount corresponding to a molar ratio of hydrogen halide: bis-(2-alkenyl) ether not less than about 2:1 at a temperature within the range of from 15° C. to 40° C. under substantially anhydrous conditions at a superatmospheric pressure between about 30 lbs. per square inch and about 200 lbs. per square inch in the presence of a cuprous halide corresponding to said hydrogen halide as catalyst, and (c) recovering a 2-alkenyl halide from the resulting mixture.

GEORGE J. CARLSON.

REFERENCES CITED

The following references are of record in the file of this patent:

UNITED STATES PATENTS

| Number | Name | Date |
|---|---|---|
| 2,168,167 | Leuchs | Aug. 1, 1939 |
| 2,176,055 | Britton et al. | Oct. 17, 1939 |
| 2,210,564 | Andrussow | Aug. 6, 1940 |

OTHER REFERENCES

Classification Bulletin of the U. S. Patent Office No. 85, Class 260, Chemistry, Carbon Compounds (1943), pages 6 and 44.